United States Patent
Kubo et al.

(10) Patent No.: US 12,293,760 B2
(45) Date of Patent: May 6, 2025

(54) VEHICLE AGENT DEVICE, VEHICLE AGENT SYSTEM, AND COMPUTER-READABLE STORAGE MEDIUM

(71) Applicant: TOYOTA JIDOSHA KABUSHIKI KAISHA, Toyota (JP)

(72) Inventors: Chikage Kubo, Chofu (JP); Keiko Nakano, Kawasaki (JP); Eiichi Maeda, Tokyo-to (JP); Hiroyuki Nishizawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 493 days.

(21) Appl. No.: 17/494,919

(22) Filed: Oct. 6, 2021

(65) Prior Publication Data
US 2022/0115014 A1    Apr. 14, 2022

(30) Foreign Application Priority Data

Oct. 9, 2020    (JP) ................................. 2020-171495

(51) Int. Cl.
G10L 15/22    (2006.01)
G10L 15/30    (2013.01)

(52) U.S. Cl.
CPC ................... *G10L 15/22* (2013.01)

(58) Field of Classification Search
CPC ..... G10L 15/22; G10L 15/1822; G10L 15/30; G10L 2015/223; G06F 3/167; H04L 67/12; H04W 4/44
See application file for complete search history.

(56) References Cited

U.S. PATENT DOCUMENTS

| | | | |
|---|---|---|---|
| 2004/0093155 A1* | 5/2004 | Simonds | B60R 16/0231 701/532 |
| 2021/0357179 A1* | 11/2021 | Takeshita | B60K 37/00 |
| 2022/0222733 A1* | 7/2022 | Mori | G10L 15/00 |

FOREIGN PATENT DOCUMENTS

| | | | | |
|---|---|---|---|---|
| CN | 111681658 A | | 9/2020 | |
| JP | 2001-141500 A | | 5/2001 | |
| JP | 2020061642 A | * | 4/2020 | ............. B60K 35/00 |
| JP | 2020144081 A | * | 9/2020 | ......... G01C 21/3629 |
| JP | 2020144260 A | * | 9/2020 | ............. B60R 16/02 |
| WO | WO-2020070878 A1 | * | 4/2020 | ............. B60K 35/00 |

* cited by examiner

*Primary Examiner* — Paras D Shah
*Assistant Examiner* — Mulugeta Tuji Dugda
(74) *Attorney, Agent, or Firm* — Sughrue Mion, PLLC

(57) ABSTRACT

A vehicle agent device receives utterance information from an on-board unit, analyzes the content of the utterance, detects, as a non-installed function from a database, a function that an occupant intended to utilize but which was not installed and is installable, generates proposal information for furnishing the occupant with information relating to the non-installed function it detected, and sends the proposal information that has been generated to the on-board unit to thereby send the information relating to the non-installed function to a preregistered mobile device carried by the occupant.

15 Claims, 9 Drawing Sheets

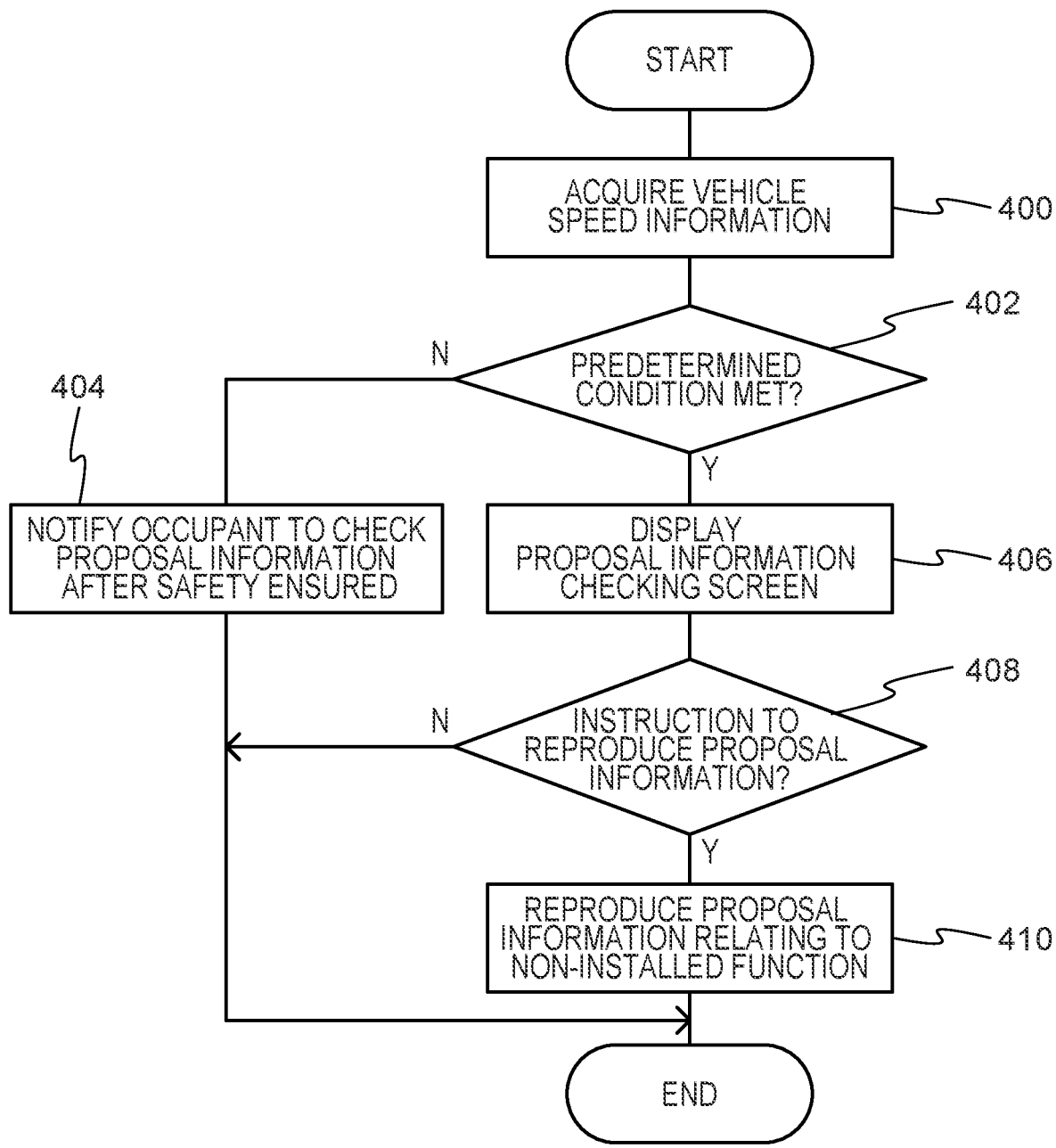

VEHICLE AGENT DEVICE, VEHICLE AGENT SYSTEM, AND COMPUTER-READABLE STORAGE MEDIUM

CROSS-REFERENCE TO RELATED APPLICATION

This application is based on and claims priority under 35 USC § 119 from Japanese Patent Application No. 2020-171495 filed on Oct. 9, 2020, the disclosure of which is incorporated by reference herein.

TECHNICAL FIELD

This disclosure relates to a vehicle agent device, a vehicle agent system, and a computer-readable storage medium that provide descriptions of devices and descriptions of operations.

RELATED ART

Japanese Patent Application Laid-open (JP-A) No. 2001-141500 (patent document 1) discloses a vehicle agent processing device that furnishes information related to operations of various types of on-board units. Specifically, the vehicle agent processing device performs speech recognition when speech information including a real voice has been applied as a signal received by a wireless communication unit, and thereafter, but without performing speech recognition in the case of an email, interprets the meaning of the information by parsing it, selects information related to operations of various types of on-board units in an automobile, summarizes the information on a priority basis, converts it to speech, and outputs it from a speaker. Furthermore, in a case where it is inferred that operation of the various types of on-board units is necessary, the vehicle agent processing device automatically judges this in an agent processing unit, adds operation guidance information relating to the on-board units, and provides voice guidance.

In a case where a vehicle function has been introduced to the vehicle agent device of patent document 1, there are cases where the function that has been introduced is not installed. In such cases, the occupant cannot even know that the function that is not installed is addable, so there is room for improvement in order for the occupant to be made aware of functions that are addable.

SUMMARY

Thus, it is an object of this disclosure to provide a vehicle agent device, a vehicle agent system, and a computer-readable storage medium with which an occupant can be made aware of functions that are addable among functions the occupant intended to utilize but which were not installed.

A vehicle agent device pertaining to a first aspect includes: an intention comprehension unit that comprehends the intention of the content of an utterance by an occupant of a subject vehicle; a detection unit that detects, as a non-installed function, a vehicle function that was included in the content of the utterance comprehended by the intention comprehension unit and that the occupant intended to utilize but which was not installed in the subject vehicle and is installable in the subject vehicle; and a processing unit that performs processing to furnish the occupant with information relating to the non-installed function detected by the detection unit.

According to the first aspect, the intention comprehension unit comprehends the intention of the content of the utterance by the occupant of the subject vehicle, and the detection unit detects, as a non-installed function, a vehicle function that was included in the content of the utterance comprehended by the intention comprehension unit and that the occupant intended to utilize but which was not installed in the subject vehicle and is installable in the subject vehicle.

The processing unit performs processing to furnish the occupant with information relating to the non-installed function detected by the detection unit. Because of this, it becomes possible to propose that the occupant add the function that the occupant intended to utilize but which was not installed in the subject vehicle and is installable, so it becomes possible for the occupant to be made aware of functions that are addable among functions that the occupant intended to utilize but which were not installed.

The vehicle agent device may further include a generation unit that generates response information with respect to the content of the utterance comprehended by the intention comprehension unit, and in a case where response information indicating that the function that the occupant intended to utilize is not installed in the subject vehicle has been generated and sent to the subject vehicle, the detection unit may detect the non-installed function, and the processing unit may perform processing to furnish the occupant with the information relating to the non-installed function. Because of this, it becomes possible to detect, as a non-installed function from the content of a dialogue, a function that the occupant intended to utilize but which was not installed and is installable.

Furthermore, the processing unit may perform processing to send the information relating to the non-installed function to a preregistered mobile device carried by the occupant. Because of this, it becomes possible for the occupant to check the mobile device at a timing other than while driving and to be made aware of non-installed functions that are addable.

Furthermore, the processing unit may send the information relating to the non-installed function to an on-board unit mounted in a vehicle, and the on-board unit may display the information relating to the non-installed function in a case where a predetermined condition signifying safety assurance has been met. Because of this, it becomes possible for the occupant to use the on-board unit to check the information relating to the non-installed function in a state in which safety has been ensured.

Another aspect of the disclosure is a vehicle agent system including: the vehicle agent device; and an on-board unit that is provided in a vehicle and is capable of receiving, and notifying the occupant of, the information relating to the non-installed function.

Still another aspect of the disclosure is a non-transitory computer-readable storage medium that stores a vehicle agent program for causing a computer to function as the vehicle agent device.

As described above, according to this disclosure, there can be provided a vehicle agent device, a vehicle agent system, and a computer-readable storage medium with which an occupant can be made aware of functions that are addable among functions that the occupant intended to utilize but which were not installed.

BRIEF DESCRIPTION OF THE DRAWINGS

FIG. 9 is a flowchart showing an example of a flow of processes performed by the on-board unit in a case where proposal information is reproducible by the on-board unit in the vehicle agent system pertaining to the embodiment.

DETAILED DESCRIPTION

Figure 1:
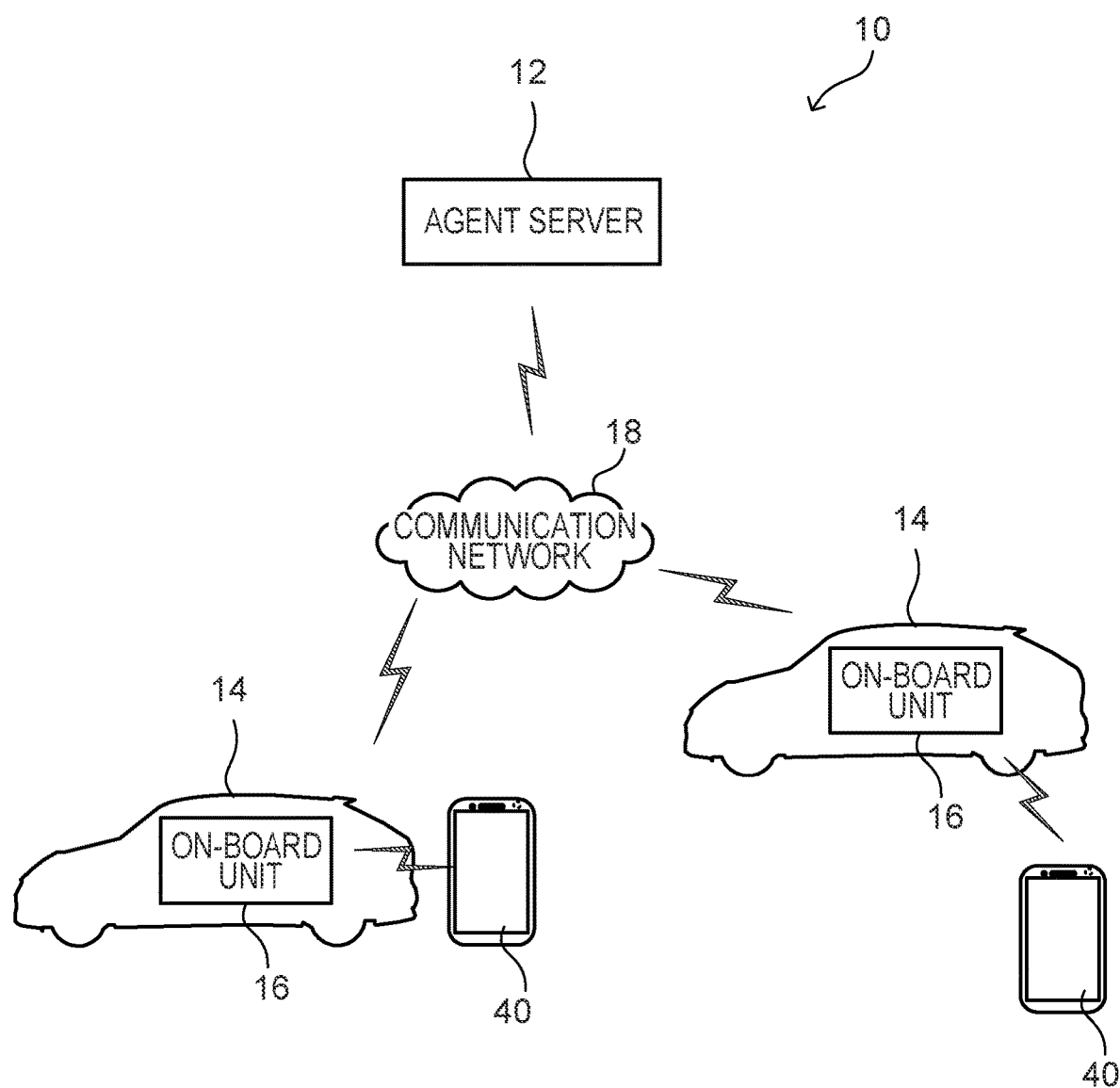
FIG. 1 is a drawing showing the schematic configuration of a vehicle agent system pertaining to an embodiment.

An example of an embodiment of the disclosure will be described in detail below with reference to the drawings. In this embodiment, a vehicle agent system 10 that furnishes an occupant with information relating to vehicle functions is described as an example. FIG. 1 is a drawing showing the schematic configuration of the vehicle agent system 10 pertaining to the embodiment.

As shown in FIG. 1, the vehicle agent system 10 is configured as a server network system including a plurality of vehicles 14 and an agent server 12 that serves as an example of a vehicle agent device.

In each vehicle 14, an on-board unit 16 is mounted, and communication between the agent server 12 and the on-board units 16 is performed via a communication network 18. Furthermore, each on-board unit 16 can communicate by near-field communication (e.g., Wi-Fi (registered trademark), Bluetooth (registered trademark), etc.) with a mobile device 40 of an occupant.

Figure 2:
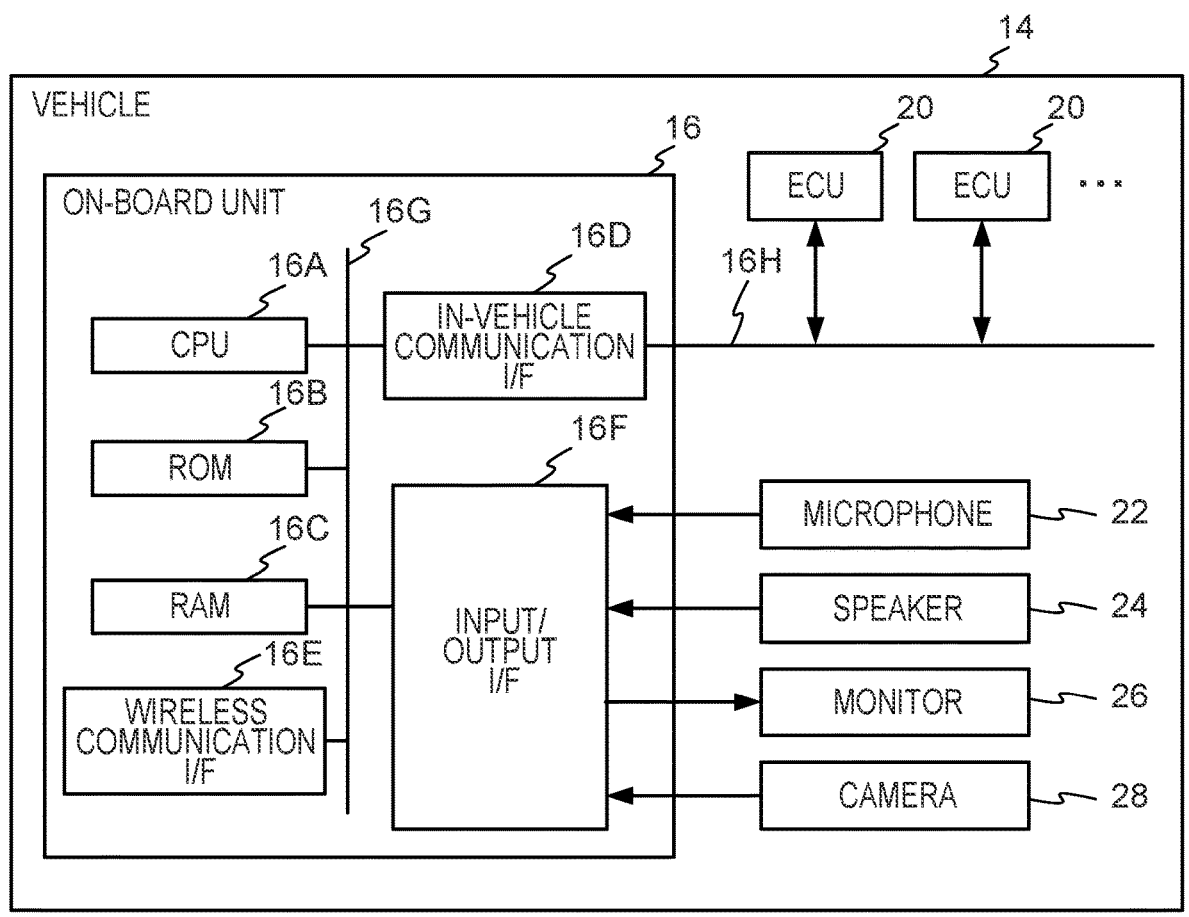
FIG. 2 is a block diagram showing an example of hardware configurations of a vehicle of the embodiment.

Next, hardware configurations of the vehicle 14 will be described. FIG. 2 is a block diagram showing an example of the hardware configurations of the vehicle 14 of the embodiment.

As shown in FIG. 2, the vehicle 14 is configured to include the on-board unit 16, a plurality of ECUs 20, a microphone 22, a speaker 24, a monitor 26, and a camera 28.

The on-board unit 16 (the on-board device) is configured to include a central processing unit (CPU) 16A, a read-only memory (ROM) 16B, a random-access memory (RAM) 16C, an in-vehicle communication interface (I/F) 16D, a wireless communication I/F 16E, and an input/output I/F 16F. The CPU 16A, the ROM 16B, the RAM 16C, the in-vehicle communication I/F 16D, the wireless communication I/F 16E, and the input/output I/F 16F are communicably connected to each other via an internal bus 16G.

The CPU 16A is a central processing unit, executes various types of programs, and controls each part of the on-board unit 16. That is, the CPU 16A reads programs from the ROM 16B and executes the programs using the RAM 16C as a workspace.

The ROM 16B stores various types of programs and various types of data. The ROM 16B of this embodiment stores a control program for controlling the on-board unit 16.

The RAM 16C, as mentioned above, temporarily stores programs or data as a workspace when the CPU 16A executes various types of programs.

The in-vehicle communication I/F 16D is an interface for connecting to the ECUs 20. The interface uses the CAN protocol communication standard. The in-vehicle communication I/F 16D is connected to an external bus 16H. The plural ECUs 20 are provided for each function of the vehicle 14. Examples of the ECUs 20 in this embodiment include a vehicle control ECU, an engine ECU, a brake ECU, a body ECU, and a multimedia ECU.

The wireless communication I/F 16E is a wireless communication module for communicating with the agent server 12. The wireless communication module uses a communication standard such as 5G LTE, or Wi-Fi (registered trademark), for example. The wireless communication I/F 16E is connected to the communication network 18. Furthermore, the wireless communication I/F 16E also functions as a wireless module for communicating with the mobile device 40 (e.g., a smartphone or a tablet) of the occupant. Communication with the mobile device 40, as mentioned above, takes place by near-field communication such as Wi-Fi (registered trademark) or Bluetooth (registered trademark).

The input/output I/F 16F is an interface for communicating with the microphone 22, the speaker 24, the monitor 26, and the camera 28 that are mounted in the vehicle 14.

The microphone 22 is provided in a front pillar or dashboard, for example, of the vehicle 14, and is a device that collects speech produced by the occupant.

The speaker 24 is provided in a door trim, for example, and outputs music and also speech based on information received from the agent server 12.

The monitor 26 is provided in a center console or instrument panel, for example, and is a monitor such as a liquid crystal monitor for displaying various types of information. The monitor 26 may also be provided as a touch panel including an operation unit such as an input switch.

The camera 28 is provided in the cabin, near the rear-view mirror for example, and captures an image of the occupant such as the driver. It will be noted that the camera 28 may also be omitted.

Figure 3:
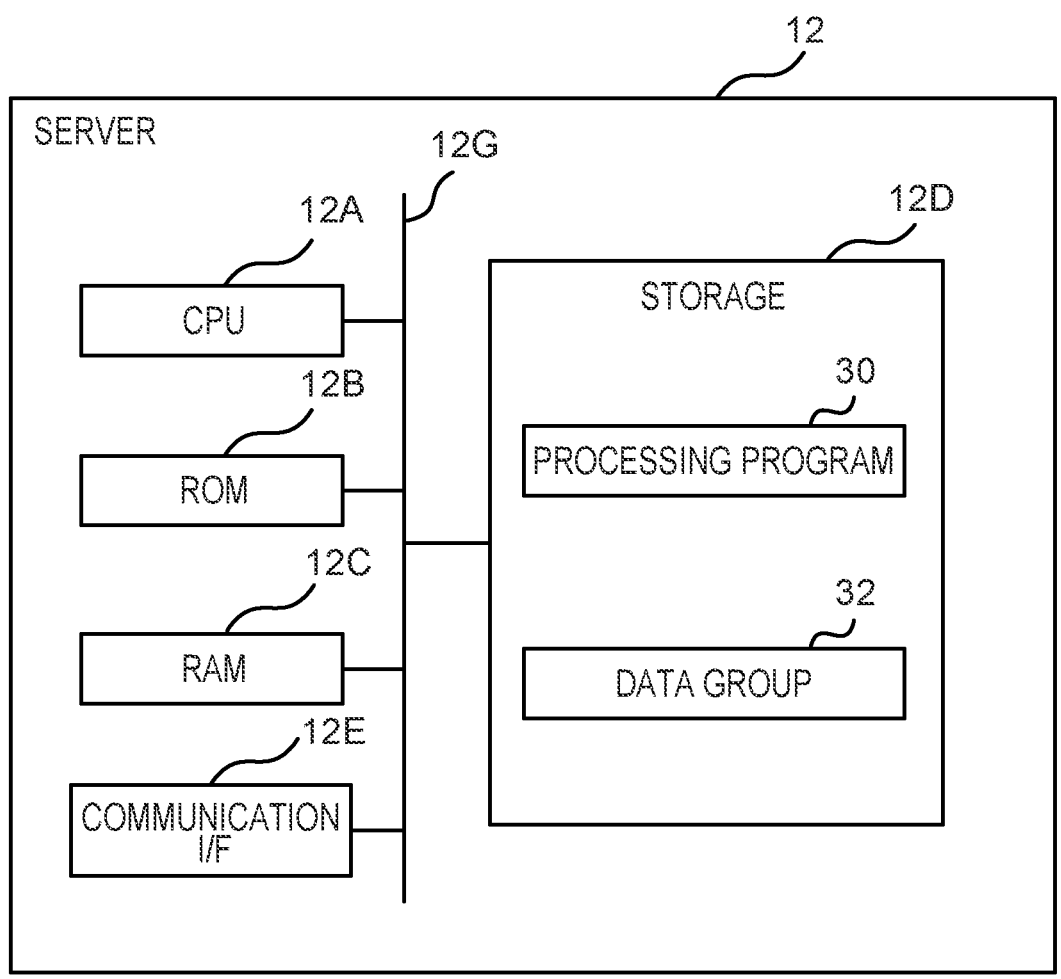
FIG. 3 is a block diagram showing hardware configurations of an agent server of the embodiment.

Next, hardware configurations of the agent server 12 will be described. FIG. 3 is a block diagram showing the hardware configurations of the agent server 12 of the embodiment.

As shown in FIG. 3, the agent server 12 is configured to include a CPU 12A, a ROM 12B, a RAM 12C, a storage 12D, and a communication I/F 12E. The CPU 12A, the ROM 12B, the RAM 12C, the storage 12D, and the communication I/F 12E are communicably connected to each other via an internal bus 12G The functions of the CPU 12A, the ROM 12B, the RAM 12C, and the communication I/F 12E are the same as those of the CPU 16A, the ROM 16B, the RAM 16C, and the wireless communication I/F 16E of the on-board unit 16 described above.

The storage 12D is configured by a storage device such as a hard disk drive (HDD) or a solid-state drive (SSD) and stores various types of programs and various types of data. The CPU 12A reads programs from the storage 12D and executes the programs using the RAM 12C as a workspace.

The storage 12D of this embodiment stores a processing program 30 and a data group 32. The processing program 30 is a program for realizing functions that the agent server 12 has.

In this embodiment, the agent server 12 carries out a spoken dialogue with the occupant and, based on the dialogue, performs processing to furnish the occupant with information relating to a function that the occupant intended to utilize but which was not installed and is installable. For example, in a case where there has been an utterance by the occupant signifying a non-installed function that is not installed in the vehicle 14, such as "Activate adaptive cruise control (ACC)," if the non-installed function is installable in the vehicle 14, the agent server 12 performs processing to furnish the occupant with, as the information relating to the non-installed function, a description of the non-installed function and information indicating that the non-installed function is installable.

Figure 4:
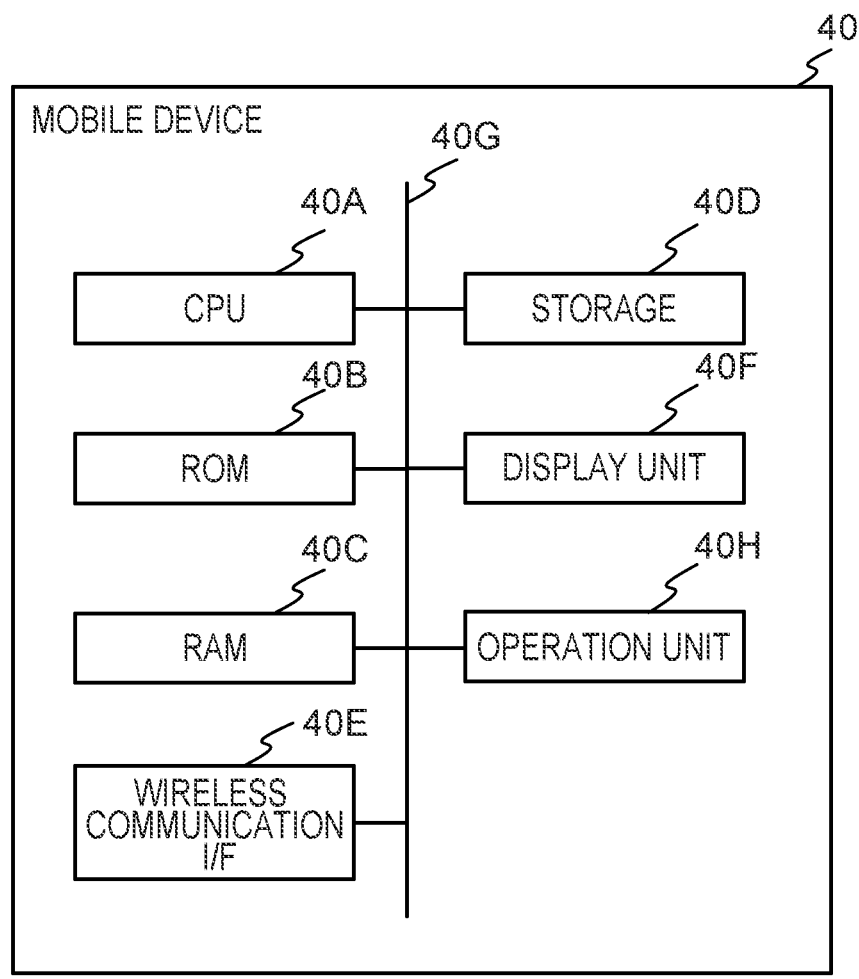
FIG. 4 is a block diagram showing hardware configurations of a mobile device of the embodiment.

Next, hardware configurations of the mobile device 40 will be described. FIG. 4 is a block diagram showing the hardware configurations of the mobile device 40 of the embodiment.

As shown in FIG. 4, the mobile device 40 is configured to include a CPU 40A, a ROM 40B, a RAM 40C, a storage 40D, a wireless communication I/F 40E, a display unit 40F, and an operation unit 40H. The CPU 40A, the ROM 40B, the RAM 40C, the storage 40D, the wireless communication I/F 40E, the display unit 40F, and the operation unit 40H are communicably connected to each other via an internal bus 40G The functions of the CPU 40A, the ROM 40B, the RAM 40C, and the wireless communication I/F 40E are the same as those of the CPU 16A, the ROM 16B, the RAM 16C, and the wireless communication I/F 16E of the on-board unit 16 described above.

The storage 40D is configured by an embedded MultiMediaCard (eMMC) or a universal flash storage (UFS), for example, and stores various types of programs and various types of data.

The CPU 40A reads programs from the storage 40D and executes the programs using the RAM 40C as a workspace.

Figure 5:
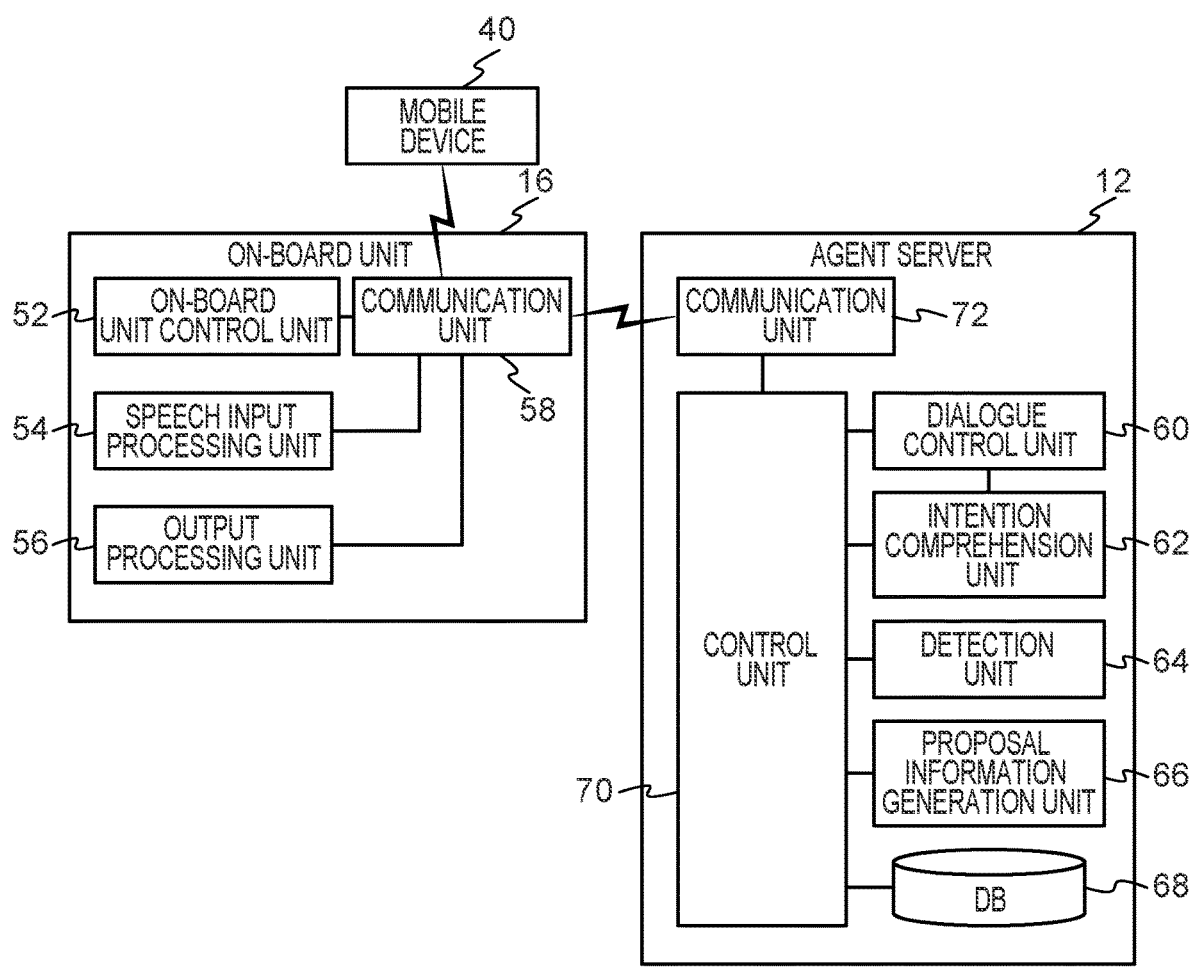
FIG. 5 is a functional block diagram showing functional configurations of an on-board unit and the agent server.

Next, functional configurations of each of the on-board unit 16 and the agent server 12 will be described. FIG. 5 is a functional block diagram showing the functional configurations of the on-board unit 16 and the agent server 12.

The on-board unit 16 has functions of an on-board unit control unit 52, a speech input processing unit 54, an output processing unit 56, and a communication unit 58 as a result of the CPU 16A transferring to the RAM 16C and executing the programs stored in the ROM 16B.

The speech input processing unit 54 performs processing to collect, with the microphone 22, utterances by the occupant and generate speech information.

The output processing unit 56 performs processing to output, as speech from the speaker 24, and/or processing to display on the monitor 26, response information with respect to the utterances by the occupant received from the agent server 12 via the communication unit 58 and information received from the agent server 12.

The communication unit 58 establishes communication with the agent server 12 and sends and receives information to and from devices such as the agent server 12 connected to the communication network 18. For example, the communication unit 58 performs processing to send vehicle information and the speech information generated by the speech input processing unit 54 to the agent server 12 and receive various types of information from the agent server 12.

Furthermore, the communication unit 58 establishes near-field wireless communication with the mobile device 40 of the occupant and sends and receives information to and from the mobile device 40. In this embodiment, the communication unit 58 sends to the mobile device 40 information relating to functions not installed in the vehicle 14 and received from the agent server 12.

The on-board unit control unit 52 performs processing to receive from the agent server 12 proposal information proposing information relating to the functions not installed in the vehicle 14. Furthermore, in a case where the on-board unit control unit 52 has received the proposal information relating to the non-installed functions from the agent server 12, the on-board unit control unit 52 performs processing to forward to the mobile device 40 of the occupant the proposal relating to the non-installed functions it has received.

The agent server 12 has multiple functions as a result of the CPU 12A transferring to the RAM 12C and executing the programs stored in the ROM 12B. As the multiple functions, the agent server 12 has functions of a control unit 70 serving as an example of a processing unit, a dialogue control unit 60 serving as an example of a generation unit, an intention comprehension unit 62, a detection unit 64, a proposal information generation unit 66, a database (DB) 68, and a communication unit 72.

The dialogue control unit 60 converts the speech information received from the on-board unit 16 to text information and outputs the text information to the intention comprehension unit 62. Furthermore, the dialogue control unit 60 performs processing to generate response information based on intention comprehension by the intention comprehension unit 62. The dialogue control unit 60 generates the response information by, for example, extracting a corresponding response from prestored responses corresponding to intention comprehension results.

The intention comprehension unit 62, in order to comprehend the intention of the content of an utterance by the occupant of the subject vehicle, comprehends, based on the text information to which the speech information was converted, the intention represented by the text information. For the intention comprehension, a variety of known techniques may be applied to comprehend the intention of the content of the utterance by the occupant, so detailed description thereof is omitted here.

The detection unit 64 detects, as a non-installed function, a vehicle function that was included in the content of the utterance comprehended by the intention comprehension unit 62 and that the occupant intended to utilize but which was not installed in the subject vehicle and is installable in the subject vehicle. For example, in this embodiment, in a case where the content of an utterance relating to a function of the vehicle 14 has been recognized by the intention comprehension unit 62 and response information indicating that the function is not installed in the vehicle 14 has been generated by the dialogue control unit 60, the detection unit 64 performs processing to detect, as a non-installed function from the DB 68, the function that the occupant intended to utilize but which was not installed and is installable.

The proposal information generation unit 66 generates proposal information for furnishing the occupant with information relating to the non-installed function detected by the detection unit 64. The proposal information that the proposal information generation unit 66 generates may be text information providing a description of the non-installed function or indicating that the non-installed function is installable, or may be image information and text information, or may be a moving image.

The DB 68 stores various types of information, such as information for comprehending the intentions of text information, information relating to functions that are installable by vehicle model, and information relating to functions that are provided in each of the vehicles 14.

The control unit 70 performs processing to send to the on-board unit 16 the proposal information generated by the proposal information generation unit 66 and furnish the occupant with the information relating to the non-installed function that is installable. Because of this, by forwarding the proposal information from the communication unit 58 of the on-board unit 16 to the mobile device 40 of the occupant, the occupant can be furnished with and check the information relating to the non-installed function at an arbitrary timing other than while driving. It will be noted that the proposal information may also be directly sent from the agent server 12 via the communication network 18 to the mobile device 40 rather than being sent to the mobile device 40 by near-field communication from the on-board unit 16.

Next, specific processes performed by each part of the vehicle agent system 10 pertaining to the embodiment configured as described above will be described.

Figure 6:
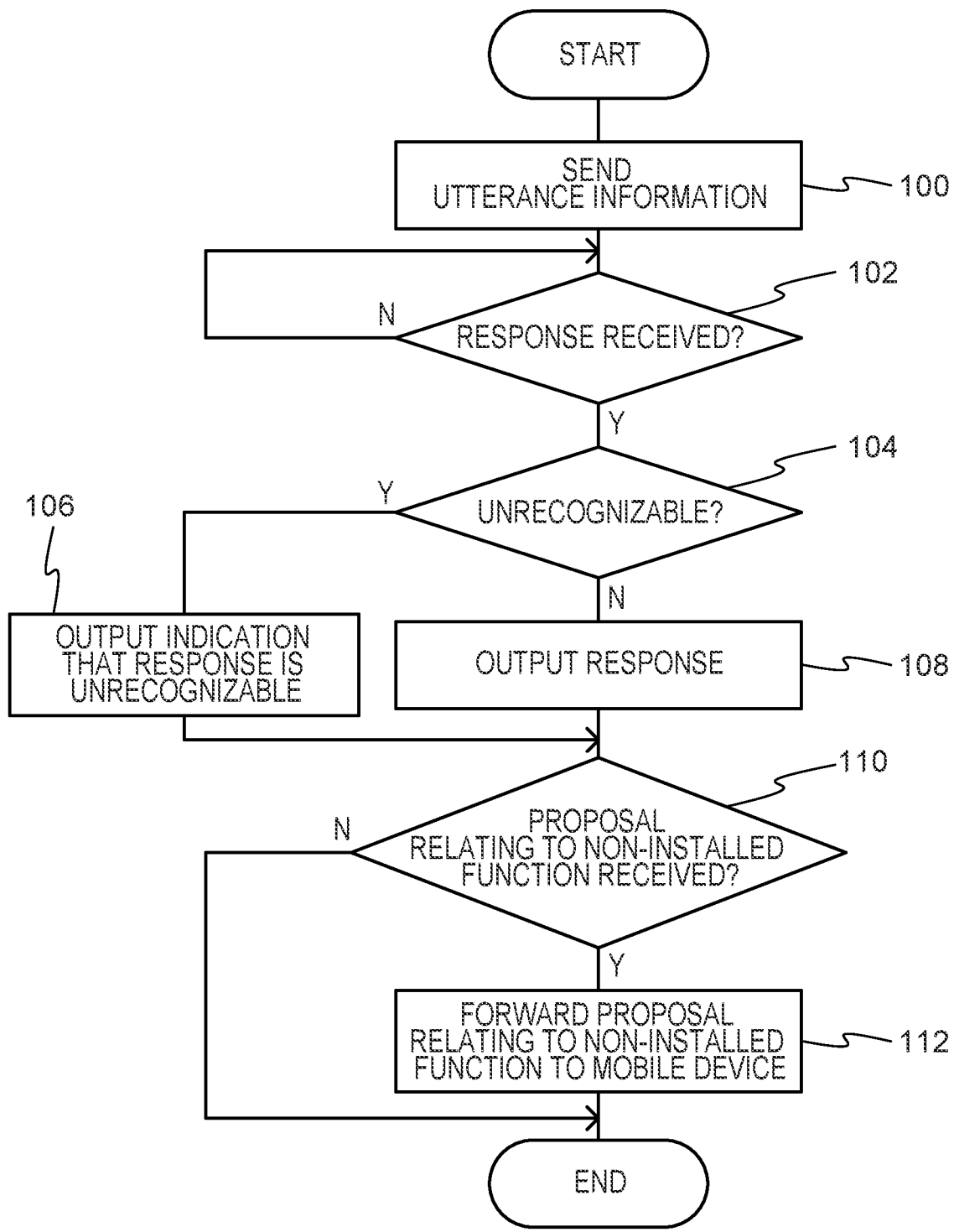
FIG. 6 is a flowchart showing an example of a flow of processes performed by the on-board unit in the vehicle agent system pertaining to the embodiment.

First, specific processes performed by the on-board unit 16 will be described. FIG. 6 is a flowchart showing an example of a flow of the processes performed by the on-board unit 16 in the vehicle agent system 10 pertaining to the embodiment. The processes in FIG. 6 start when, for example, the speech input processing unit 54 has detected, by means of the sound collection by the microphone 22, an utterance by the occupant.

In step 100 the CPU 16A sends the utterance information to the agent server 12, and then the CPU 16A moves to step 102. That is, the speech input processing unit 54 generates speech information from the sound collected by the microphone 22 and sends the speech information as the utterance information via the communication unit 58 to the agent server 12.

In step 102 the CPU 16A determines whether or not it has received from the agent server 12 a response with respect to the utterance information. The CPU 16A stands by until the determination becomes YES, and then moves to step 104.

In step 104 the CPU 16A determines whether or not the utterance information is unrecognizable. The CPU 16A performs this determination based on whether or not it has received from the agent server 12 information indicating that the content of the utterance is unrecognizable. In a case where the determination is YES, the CPU 16A moves to step 106, and in a case where the determination is NO, the CPU 16A moves to step 108.

In step 106 the CPU 16A outputs an indication that the content of the utterance is unrecognizable, and then the CPU 16A moves to step 110. That is, the output processing unit 56, as a response with respect to the occupant's utterance received via the communication unit 58 from the agent server 12, performs processing to output from the speaker 24 a voice indicating that the content of the utterance is unrecognizable, and/or processing to display on the monitor 26 an indication that the content of the utterance is unrecognizable.

In step 108 the CPU 16A outputs the response, and then the CPU 16A moves to step 110. That is, the output processing unit 56 performs processing to output as speech from the speaker 24, and/or processing to display on the monitor 26, the response information with respect to the occupant's utterance received via the communication unit 58 from the agent server 12.

In step 110 the CPU 16A determines whether or not it has received a proposal relating to a non-installed function. The CPU 16A performs this determination based on whether or not the on-board unit control unit 52 has received proposal information relating to a non-installed function from the agent server 12. In a case where the determination is NO, the CPU 16A ends the series of processes, and in a case where the determination is YES, the CPU 16A moves to step 112.

In step 112 the CPU 16A forwards the proposal information relating to the non-installed function to the mobile device 40 of the occupant, and then the CPU 16A ends the series of processes.

Figure 7:
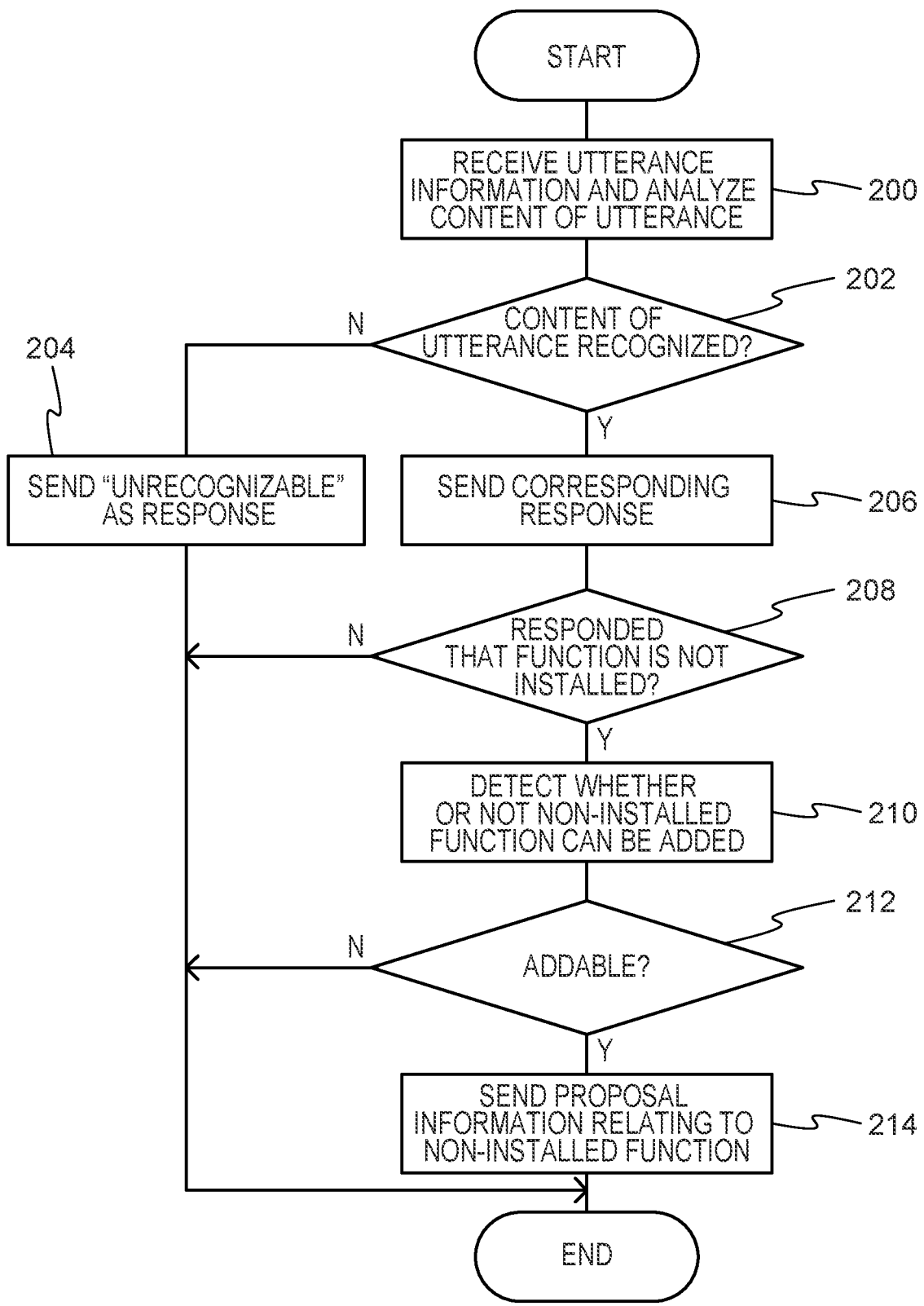
FIG. 7 is a flowchart showing an example of a flow of processes performed by the agent server in the vehicle agent system pertaining to the embodiment.

Next, specific processes performed by the agent server 12 will be described. FIG. 7 is a flowchart showing an example of a flow of the processes performed by the agent server 12 in the vehicle agent system 10 pertaining to the embodiment. The processes in FIG. 7 start when the utterance information has been sent from the on-board unit 16 by step 100 described above.

In step 200 the CPU 12A receives the utterance information sent from the on-board unit 16 and analyzes the content of the utterance, and then the CPU 12A moves to step 202. That is, the CPU 12A receives the utterance information sent from the on-board unit 16 in step 100 described above, whereupon the dialogue control unit 60 converts the utterance information to text information and the intention comprehension unit 62 comprehends, based on the text information, the intention represented by the text information.

In step 202 the CPU 12A determines whether or not it has recognized the content of the utterance. The CPU 12A performs this determination based on whether or not the dialogue control unit 60 was able to recognize the content of the utterance after the intention comprehension by the intention comprehension unit 62. In a case where the determination is NO, the CPU 12A moves to step 204, and in a case where the determination is YES, the CPU 12A moves to step 206.

In step 204 the CPU 12A sends "unrecognizable" as a response to the on-board unit 16, and then the CPU 12A ends the series of processes. That is, the dialogue control unit 60 generates, and sends via the communication unit 72 to the on-board unit 16, response information indicating that the content of the utterance is unrecognizable based on the intention comprehension by the intention comprehension unit 62. Because of this, in the on-board unit 16, the determinations in each of step 102 and step 104 described above become YES.

In step 206 the CPU 12A sends the corresponding response to the on-board unit 16, and then the CPU 12A moves to step 208. That is, the dialogue control unit 60 generates, and sends via the communication unit 72 to the on-board unit 16, response information based on the intention comprehension by the intention comprehension unit 62. Because of this, in the on-board unit 16, the determination in step 102 described above becomes YES and the determination in step 104 becomes NO.

In step 208 the CPU 12A determines whether or not it responded that the function is non-installed. The CPU 12A performs this determination based on whether or not the detection unit 64 detects that response information including content indicating that the function is not installed in the vehicle 14 was generated by the dialogue control unit 60. In a case where the determination is NO, the CPU 12A ends the series of processes, and in a case where the determination is YES, the CPU 12A moves to step 210.

In step 210 the CPU 12A detects whether or not the non-installed function can be added, and then the CPU 12A moves to step 212. That is, the detection unit 64 detects, as a non-installed function from the DB 68, the function that the occupant intended to utilize but which was not installed and is installable.

In step 212 the CPU 12A determines whether or not it is possible to add the non-installed function. The CPU 12A performs this determination based on whether or not the detection unit 64 was able to detect, as a non-installed function from the DB 68, the function that the occupant intended to utilize but which was not installed and is installable. In a case where the determination is NO, the CPU 12A ends the series of processes, and in a case where the determination is YES, the CPU 12A moves to step 214.

In step 214 the CPU 12A sends the proposal information relating to the non-installed function to the on-board unit 16, and then the CPU 12A ends the series of processes. That is, the proposal information generation unit 66 generates the proposal information for furnishing the occupant with the information relating to the non-installed function that the detection unit 64 detected, and the control unit 70 sends the proposal information generated by the proposal information generation unit 66 to the on-board unit 16. Because of this, by performing the process to send the proposal information to the on-board unit 16, the process by the on-board unit 16 in step 112 described above is performed. In other words, by sending the information relating to the non-installed function to the on-board unit 16, the information relating to the non-installed function is sent to the preregistered mobile device 40 carried by the occupant. Consequently, information relating to functions not installed in the vehicle 14 is forwarded to the mobile device 40 of the occupant, so it becomes possible for the occupant to be made aware of, at a timing when the occupant wants to check, functions that are addable among functions that the occupant intended to utilize but which were not installed. It will be noted that the vehicle agent system 10 may also be configured in such a way that the mobile device 40 of the occupant is preregistered in the agent server 12 and information relating to functions not installed in the vehicle 14 is directly sent to the mobile device 40 without involving the on-board unit 16.

Figure 8:
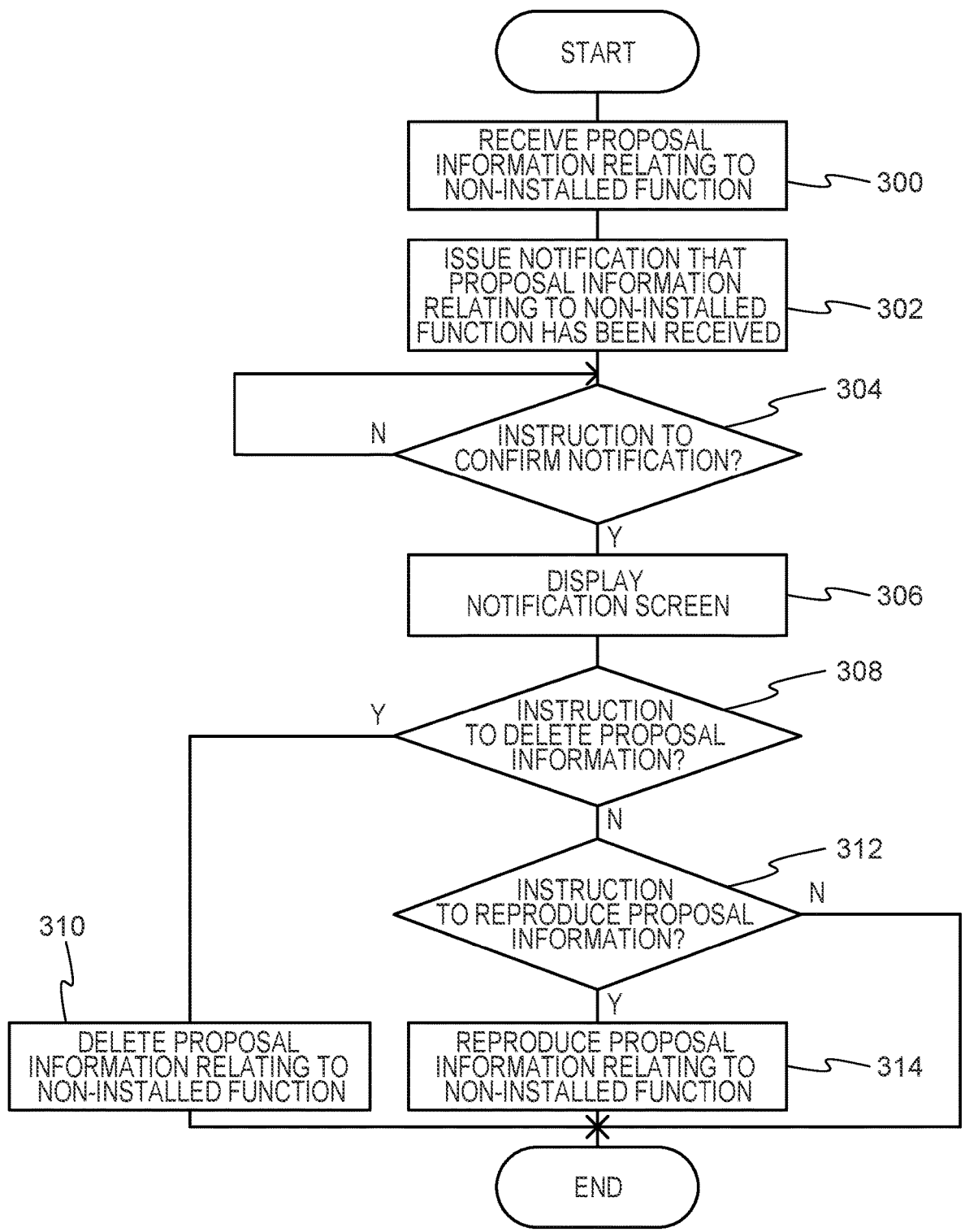
FIG. 8 is a flowchart showing an example of a flow of processes performed by the mobile device in the vehicle agent system pertaining to the embodiment.

Next, specific processes performed by the mobile device 40 will be described. FIG. 8 is a flowchart showing an example of a flow of the processes performed by the mobile device 40 in the vehicle agent system 10 pertaining to the embodiment. The processes in FIG. 8 start when the proposal information has been forwarded from the on-board unit 16.

In step 300 the CPU 40A receives the proposal information relating to the non-installed function, and then the CPU 40A moves to step 302. That is, the CPU 40A receives the proposal information that was forwarded from the on-board unit 16 by the process of step 112 described above.

In step 302 the CPU 40A issues a notification that it has received the proposal information relating to the non-installed function, and then the CPU 40A moves to step 304. For example, the CPU 40A displays on the display unit 40F of the mobile device 40 a notification indicating that it has received the proposal information. Alternatively, the CPU 40A generates a notification sound indicating that it has received the proposal information.

In step 304 the CPU 40A determines whether or not a confirmation of the notification has been instructed. The CPU 40A performs this determination based on whether or not the operation unit 40H has been operated and an instruction confirming the notification has been given. The CPU 40A stands by until the determination is YES, and then moves to step 306.

In step 306 the CPU 40A displays a predetermined notification image on the display unit 40F, and then the CPU 40A moves to step 308. A predetermined notification screen, for example, displays content indicating that proposal information has been received, and displays a screen with which it is possible to instruct reproduction of the proposal information.

In step 308 the CPU 40A determines whether or not an instruction to delete the proposal information has been given. The CPU 40A performs this determination based on whether or not the operation unit 40H has been operated and an instruction to delete the proposal information has been given. In a case where the determination is YES, the CPU 40A moves to step 310, and in a case where the determination is NO, the CPU 40A moves to step 312.

In step 310 the CPU 40A deletes the proposal information relating to the non-installed function, and then the CPU 40A ends the series of processes.

In step 312 the CPU 40A determines whether or not reproduction of the proposal information has been instructed. The CPU 40A performs this determination based on whether or not the operation unit 40H has been operated and reproduction of the proposal information has been instructed. In a case where the determination is YES, the CPU 40A moves to step 314. In a case where the determination is NO, the CPU 40A ends the series of processes. It will be noted that in a case where the CPU 40A has ended the series of processes in FIG. 8 without an operation to delete the proposal information being performed, the CPU 40A may also reproduce the proposal information in a case where reproduction of the proposal information has been instructed as a result of the operation unit 40H being operated at an arbitrary timing.

In step 314 the CPU 40A reproduces on the display unit 40F the proposal information relating to the non-installed function, and then the CPU 40A ends the series of processes. Because of this, the occupant can view and/or listen to the proposal information at a timing when the occupant wants to view and/or listen to the proposal information, and can check functions that are addable among functions that the occupant intended to utilize but which were not installed.

Although in the above embodiment an example was described where the proposal information relating to the function not installed in the vehicle 14 is forwarded to the mobile device 40 of the occupant, the vehicle agent system 10 is not limited to this. For example, the proposal information may also be forwarded to a preregistered personal computer or the like of the occupant, and the occupant may use the personal computer to reproduce the proposal information. Alternatively, the proposal information may be reproducible by the on-board unit 16.

Here, a case where the proposal information is reproducible by the on-board unit 16 will be described. FIG. 9 is a flowchart showing an example of a flow of processes performed by the on-board unit 16 in a case where the proposal information is reproducible by the on-board unit 16 in the vehicle agent system 10 pertaining to the embodiment. The processes in FIG. 9 start when, for example, the on-board unit 16 has received the proposal information and thereafter an instruction to check the proposal information has been given by speech or operation. Furthermore, in a case where the proposal information is reproducible by the on-board unit 16, forwarding of the proposal information to the mobile device 40 may be omitted. Alternatively, whether or not to forward the proposal information to the mobile device 40 may also be made settable.

In step 400 the CPU 16A acquires vehicle speed information relating to the vehicle 14 in which the on-board unit 16 is mounted, and then the CPU 16A moves to step 402. The CPU 16A may acquire the vehicle speed information from a vehicle speed sensor provided in the vehicle 14 or may acquire the vehicle speed information by acquiring satellite information for calculating the position of the vehicle 14.

In step 402 the CPU 16A determines whether or not a predetermined condition signifying safety assurance of the vehicle 14 has been met. The CPU 16A performs this determination based, for example, on whether or not the vehicle 14 is parked as the predetermined condition. Alternatively, in a case where the vehicle 14 is equipped with autonomous driving capabilities for example, the CPU 16A may also acquire vehicle information indicating whether or not the autonomous driving mode is being executed in step 400 to determine whether or not the vehicle 14 is driving autonomously. In a case where the CPU 16A determines whether or not the vehicle 14 is parked as the predetermined condition, the CPU 16A may perform the determination based on, for example, whether or not the vehicle speed is 0 or equal to or less than a predetermined speed from the acquired vehicle speed information. In a case where the determination is NO, the CPU 16A moves to step 404, and in a case where the determination is YES, the CPU 16A moves to step 406.

In step 404, the CPU 16A, after ensuring safety, notifies the occupant to check the proposal information, and then the CPU 16A ends the series of processes. For example, the output processing unit 56 performs at least one of outputting from the speaker 24 a message such as "Please check the proposal information after parking the car" and displaying the message on the monitor 26.

In step 406 the CPU 16A displays a predetermined proposal information checking screen on the monitor 26, and then the CPU 16A moves to step 408. The predetermined proposal information checking screen, for example, displays a list of the proposal information received from the agent server 12.

In step 408 the CPU 16A determines whether or not reproduction of the proposal information has been instructed. The CPU 16A performs this determination based on whether or not an instruction to reproduce the proposal information has been given by speech or operation, for example. In a case where the determination is YES, the CPU 16A moves to step 410, and in a case where the determination is NO, the CPU 16A ends the series of processes and performs other processes.

In step 410 the CPU 16A reproduces on the monitor 26 the proposal information relating to the non-installed function, and then the CPU 16A ends the series of processes. Because of this, the occupant can view and/or listen to the proposal information at a timing when the occupant wants to view and/or listen to the proposal information, and can check functions that are addable among functions that the occupant intended to utilize but which were not installed. Furthermore, because the proposal information is reproduced at a timing when the vehicle 14 is parked, the occupant can check the proposal information relating to the non-installed function in a state in which safety has been ensured.

Although in the above embodiment an example was described where dialogue is possible between the agent server 12 and the occupant, the vehicle agent system 10 is not limited to this and may also have a configuration where a dialogue function is omitted. In this case, for example, the on-board unit control unit 52 of the on-board unit 16 has the function of detecting, from operations by the occupant for example, non-installed functions that the occupant intended to utilize but which were not installed and the function of notifying the agent server 12 in a case where it has detected the non-installed functions, and the agent server 12 detects the functions that are installable among the non-installed functions. Because of this, the proposal information generation unit 66 of the agent server 12 generates the proposal information so that processes that are the same as those in the above embodiment become possible. Alternatively, the agent server 12 may also be configured to just comprehend the intention of the content of an utterance by the occupant and omit generating response information with respect to the content of the utterance.

Furthermore, the processes performed by each part of the vehicle agent system 10 in the above embodiment were described as software processes performed by executing programs, but the processes are not limited to this. For example, the processes may also be performed by hardware such as a graphics processing unit (GPU), an application-specific integrated circuit (ASIC), and a field-programmable gate array (FPGA). Alternatively, the processes may also be performed by a combination of both software and hardware. Furthermore, in a case where the processes are performed by software, the programs may be stored in various types of storage media and circulated.

Moreover, it goes without saying that the disclosure is not limited to what is described above and can, in addition to what is described above, be modified in a variety of ways and implemented in a range that does not depart from the spirit of the disclosure.

What is claimed is:

1. A vehicle agent device comprising a processor and a memory storing a program executed by the processor, so that the processor is configured to:
   comprehend an intention of a content of an utterance by an occupant of a subject vehicle;
   detect a vehicle function that was included in the content of the utterance comprehended and that the occupant intended to utilize;
   determine whether or not the vehicle function is currently installed in the subject vehicle;
   based upon the determination that the vehicle function is not currently installed in the subject vehicle, determine that the vehicle function is a non-installed function;
   detect whether or not the non-installed function is installable in the subject vehicle;
   based upon the detection that the non-installed function is installable in the subject vehicle, perform processing to acquire information relating to the detected non-installed function, and furnish the occupant with the information that includes proposal information for installing the non-installed function in the subject vehicle; and
   based upon the detection that the non-installed function is not installable in the subject vehicle, do not furnish the occupant with the information.

2. The vehicle agent device of claim 1, wherein the processor is further configured to:
   generate response information with respect to the content of the utterance comprehended,
   in a case where response information indicating that the function that the occupant intended to utilize is not installed in the subject vehicle has been generated and sent to the subject vehicle, detect the non-installed function, and perform processing to furnish the occupant with the information relating to the non-installed function.

3. The vehicle agent device of claim 2, wherein the processor performs processing to send the information relating to the non-installed function to a preregistered mobile device carried by the occupant.

4. A vehicle agent system comprising:
   the vehicle agent device of claim 2; and an on-board unit including a memory storing a program and a processor configured to execute the program, wherein the on-board unit is provided in the subject vehicle and is configured to receive, and notify the occupant of, the information relating to the non-installed function, wherein in a case where a predetermined condition signifying safety assurance has not been met, the on-board unit notifies the user to check the information relating to the non-installed function after the predetermined condition signifying safety assurance has been met, and the processor sends the information relating to the non-installed function to the on-board unit, and the on-board unit displays the information relating to the non-installed function in a case where the processor detects that the predetermined condition signifying safety assurance has been met.

5. A vehicle agent system comprising:
the vehicle agent device of claim 2;
a pre-registered mobile device carried by the occupant; and
an on-board unit including a memory storing a program and a processor configured to execute the program, wherein the on-board unit is provided in the subject vehicle and is configured to receive, and notify the occupant of, the information relating to the non-installed function, wherein the processor is configured to perform processing to transfer the information relating to the non-installed function to the preregistered mobile device, and the processor is configured to enable the user, via an input device, to set whether or not to transfer the information relating to the non-installed function to the preregistered mobile device if the user permits the display of the information relating to the non-installed function at the on-board device.

6. A non-transitory computer-readable storage medium that stores a vehicle agent program for causing a computer to function as the vehicle agent device of claim 2.

7. The vehicle agent device of claim 1, wherein the processor performs processing to send the information relating to the non-installed function to a preregistered mobile device carried by the occupant.

8. A vehicle agent system comprising:
the vehicle agent device of claim 7; and
an on-board unit including a memory storing a program and a processor configured to execute the program, wherein the on-board unit, wherein the on-board unit is provided in the subject vehicle and is configured to receive, and notify the occupant of, the information relating to the non-installed function, wherein in a case where a predetermined condition signifying safety assurance has not been met, the on-board unit notifies the user to check the information relating to the non-installed function after the predetermined condition signifying safety assurance has been met, and the processor sends the information relating to the non-installed function to the on-board unit, and the on-board unit displays the information relating to the non-installed function in a case where the processor detects that the predetermined condition signifying safety assurance has been met.

9. A vehicle agent system comprising:
the vehicle agent device of claim 7;
a pre-registered mobile device carried by the occupant; and an on-board unit including a memory storing a program and a processor configured to execute the program, wherein the on-board unit is provided in the subject vehicle and is configured to receive, and notify the occupant of, the information relating to the non-installed function, wherein the processor is configured to perform processing to transfer the information relating to the non-installed function to the preregistered mobile device, and the processor is configured to enable the user, via an input device, to set whether or not to transfer the information relating to the non-installed function to the preregistered mobile device if the user permits the display of the information relating to the non-installed function at the on-board device.

10. A non-transitory computer-readable storage medium that stores a vehicle agent program for causing a computer to function as the vehicle agent device of claim 7.

11. A vehicle agent system comprising:
the vehicle agent device of claim 1; and
an on-board unit including a memory storing a program and a processor configured to execute the program, wherein the on-board unit is provided in the subject vehicle and is configured to receive, and notify the occupant of, the information relating to the non-installed function, wherein in a case where a predetermined condition signifying safety assurance has not been met, the on-board unit notifies the user to check the information relating to the non-installed function after the predetermined condition signifying safety assurance has been met, and the processor sends the information relating to the non-installed function to the on-board unit, and the on-board unit displays the information relating to the non-installed function in a case where the processor detects that the predetermined condition signifying safety assurance has been met.

12. The vehicle agent device of claim 11, wherein, the predetermined condition is that the vehicle is parked.

13. A vehicle agent system comprising:
the vehicle agent device of claim 1;
a pre-registered mobile device carried by the occupant; and
an on-board unit including a memory storing a program and a processor configured to execute the program, wherein the on-board unit is provided in the subject vehicle and is configured to receive, and notify the occupant of, the information relating to the non-installed function, wherein the processor is configured to perform processing to transfer the information relating to the non-installed function to the preregistered mobile device, and the processor is configured to enable the user, via an input device, to set whether or not to transfer the information relating to the non-installed function to the preregistered mobile device if the user permits the display of the information relating to the non-installed function at the on-board device.

14. The vehicle agent system of claim 13, wherein, to comprehend the intention of the connect of the utterance, the processor is configured to:
receive utterance information sent from the on-board unit;
convert the utterance information to text information, and comprehend the intention represented by the text information.

15. A non-transitory computer-readable storage medium that stores a vehicle agent program for causing a computer to function as the vehicle agent device of claim 1.

* * * * *